(12) United States Patent
Richter (10) Patent No.: US 7,178,479 B1
(45) Date of Patent: Feb. 20, 2007

(54) PERIPHERAL VIEW SPEEDOMETER

(76) Inventor: Milton Richter, 34 Bennet St., Monticello, NY (US) 12701

( * ) Notice: Subject to any disclaimer, the term of this patent is extended or adjusted under 35 U.S.C. 154(b) by 0 days.

(21) Appl. No.: 11/338,487

(22) Filed: Jan. 23, 2006

(51) Int. Cl.
*G01D 11/28* (2006.01)

(52) U.S. Cl. .................. 116/288; 116/62.1; 116/286; 362/23; 362/29

(58) Field of Classification Search ........ 116/286–288, 116/293, 295, 298, 300, 301, 62.1, DIG. 36, 116/DIG. 5; 362/23, 26, 27, 29–30
See application file for complete search history.

(56) References Cited

U.S. PATENT DOCUMENTS

| 2,286,737 | A |   | 6/1942  | Hills |
| 2,287,605 | A |   | 6/1942  | Dickson et al. |
| 2,314,817 | A | * | 3/1943  | Christensen ............... 116/62.1 |
| 2,711,153 | A | * | 6/1955  | Wendt ....................... 116/62.3 |
| 2,907,297 | A |   | 10/1959 | Zargarqur |
| 3,890,716 | A | * | 6/1975  | Hatch ........................... 33/1 D |
| 4,935,850 | A |   | 6/1990  | Smith, Jr. |
| 6,561,123 | B2 | * | 5/2003 | Kallinke et al. ............ 116/288 |
| 6,827,034 | B1 | * | 12/2004 | Paulo ......................... 116/286 |

\* cited by examiner

*Primary Examiner*—Richard Smith
*Assistant Examiner*—Tania Courson
(74) *Attorney, Agent, or Firm*—Sandra M. Kotin (57) ABSTRACT

A speedometer face plate assembly that incorporates a border of light transmitting segments above the speed indicating numerals is disclosed. Each of the segments is a different color. The colored segments are lighted from behind as the speed changes so that colored light is visible both peripherally and directly to the driver. Each color is associated with a specific speed increment so that once the driver becomes familiar with this speedometer face plate assembly, he or she will be aware of the speed traveled according to the color of the light and will not have to look directly at the speedometer as frequently as is currently necessary. In addition to the colored light transmitting border, there may also be a colored light transmitting section under the numerals or at another area on the speedometer face to further enhance the colored light effect. This speedometer face plate assembly contributes to increasing driving safety.

19 Claims, 5 Drawing Sheets

PERIPHERAL VIEW SPEEDOMETER

FIELD OF THE INVENTION

The instant invention relates to a speedometer face plate assembly with an illuminated color-varied border for peripheral view enhancement.

BACKGROUND OF THE INVENTION

In recent years motor vehicles have become increasingly more powerful and capable of traveling at higher and higher speeds. Speed limits have also been increasing and often vehicles travel considerably beyond posted speed limits. These powerful automobiles are so well built that high speeds can be attained without the driver being aware of just how fast he or she is traveling.

The availability of cruise control devices have made it easier to stay within acceptable speed limits, but many drivers fail to take advantage of such devices making it necessary that the driver constantly look at the speedometer in order to maintain proper speed. The more often the driver's eyes are taken away from the road, the greater the chance of getting into a problem situation. A peripherally viewed speed indicator, one that lessens the need for the driver to look away from the road, would provide an enhanced safety factor to current speedometer technology.

There have been some attempts to color code the speedometer to make the driver more aware of changes in speed, but these have involved some complex and clumsy mechanisms and did not really achieve the desired result.

Hills, in U.S. Pat. No. 2,286,737, discloses a speedometer having a plate with the speed numbers on its face. Behind the plate are two opposingly situated light bulbs and a Lucite rod that rotates between them. A pointer situated in front of the plate rotates with the rod. Between the Lucite rod and the plate is a disc divided into three colored areas, green, amber and red. As light is transmitted from behind the speedometer face it passes through one of the colored areas causing colored light to be transmitted through an opening in the hub to the pointer. The light is green for speeds from 0 to 30 mph, amber for speeds from 30 to 50 mph and red for speeds above 50 mph. The mechanisms in this speedometer would be cumbersome and impractical by modern standards. A similar device using the same colors for like speed ranges is disclosed by Dickson et al. in U.S. Pat. No. 2,287,605. The round transparent face of the speedometer dial has lines and numerals etched into the rear of the dial. The depressions are filled in with a light reflecting substance. An annular member located behind the face and within a central hub is divided into three segments, one each of the three colors noted above. A rear light source and an optical system transmit appropriately colored light to the pointer in front of the face and for edge illumination to the center portion of the dial. The colors change as the speed changes. In the speedometer of Christensen (U.S. Pat. No. 2,314,817) it is only the pointer that is illuminated in one of the three colors, green, amber and red. A color screen is lit from behind and the colored light directed through a slot to the pointer. When the speed is between 0 and 30 mph the pointer takes on a green color, 30 to 50 mph an amber color, and above 50 mph, a red color.

The speedometer of Zargarpur (U.S. Pat. No. 2,907,297) also uses three colors to indicate the speeds, green 0 to 25 mph, amber 25 to 50 mph, and red above 50 mph. The speeds are registered on a linear scale. There is a slot below the scale and a rotating drum behind the slot. The drum has a red section and a black section separated by a waved line. A color disc is situated at one end of the drum. Light shines through the color disc and onto the drum. The rotating areas cause the colored light showing through the slot to be seen in light to dark hues of the three colors.

In U.S. Pat. No. 4,935,850, Smith, Jr. teaches a speedometer that utilizes three semicircular plates spaced apart along a shaft. A pointer is situated in front of the forward plate. The pointer and center plate are rotated by the shaft which is activated by the speedometer servo-driver. The front plate has an outer arc with speed numerals and indicator lines which are made up of fiber optic bundles that transmit ambient light to the rear. The center plate has a non-reflective mid-portion and an outer reflective arc and the rear plate has a black center and transparent arc containing a series of monochromatic filters. Bulbs behind the rear plate shine light through the colored filters. As the center plate rotates different colors are transmitted and reflected back through the fiber optic bundles to color the numerals and speed indicator lines. The light is white for speeds from 0 to 25 mph, blue for speeds form 25 to 45 mph, yellow for speeds from 45 to 65 mph, and red for speeds over 65 mph.

All of the prior art speedometers that exhibit colors to highlight specific speeds utilize color transmission systems where the colors are located behind the speedometer face and must be transmitted by different optical means to the pointer, hub area, or the numerals and speed indicator lines. There is a need for a simple system that utilizes colors to indicate different speeds in such a manner that the driver can observe the colors peripherally without having to constantly look at the speedometer. There is a need for such a system where the colors are more visually prominent, more colors can be used, and complex optical and light transmission mechanisms are not necessary.

BRIEF SUMMARY OF THE INVENTION

The present invention provides a speedometer face plate assembly that exhibits a smooth transition from one color to another of a logical color progression as the speed increases or decreases in such a manner that the driver has peripheral view as well as direct view of the changing colors and is made aware of the speed traveled without having to constantly look at the speedometer.

It is an object of the present invention to provide a speedometer face plate assembly that exhibits a progression of different colors, each corresponding to a different speed increment.

It is another object of the present invention to provide a speedometer face plate assembly wherein the colors are visible peripherally to the driver so that the need to frequently glance at the speedometer is considerably lessened.

A further object of the present invention is to provide a speedometer face plate assembly that exhibits a logical progression of color changes as the speed changes to make it easy for the driver to instantly interpret the meaning each color.

Another object of the present invention is to provide a sufficient number of color variations to cover the wide range of speeds currently permitted.

A further object of the present invention is to provide enough color variations so that each color represents a narrow range of speed increments.

An object of the present invention is to have the colors presented on an outer border of the speedometer face plate so that they may be easily observed by the driver.

It is a still further object of the present invention to provide a speedometer face plate assembly with changing color capacity that does not require additional space within the crowded dashboard.

Another object of the present invention is to provide a speedometer face plate assembly that exhibits changing colors with changing speeds that is inexpensive and simple to manufacture.

The present invention is an instrument face plate assembly comprising a face plate having an obverse face and a reverse face with indicia in the form of a numerical progression on the obverse face, a light transmitting band disposed above the indicia and divided into a plurality of bounded areas, each bounded area being of a different color, a rotatable shaft extending through the face plate, a pointer disposed in front of the face plate adjacent to the obverse face, one end of which is affixed to the shaft such that the pointer is rotatable with the shaft, and a light member disposed in back of the face plate adjacent to the reverse face and substantially behind and parallel to the pointer. One end of the light member is affixed to the shaft such that the light member is rotatable with the shaft and the pointer. The light member is capable of illuminating one colored bounded area of the band at any given time. As the shaft is rotated the pointer indicates a particular indicia and the colored bounded area above that indicia is illuminated from behind causing colored light to be visible both peripherally and directly by an observer. The colored light is associated with the particular indicia indicated by the pointer.

The present invention is also an instrument face plate assembly comprising a first plate having an obverse face and a reverse face and indicia in the form of a numerical progression on the obverse face, a second plate having an obverse face and a reverse face disposed behind and contiguous with the first plate and extending therebeyond, the extension forming a light transmitting band disposed above the indicia, the band being divided into a plurality of bounded areas, each bounded area being of a different color. There is a rotatable shaft extending through the first plate and the second plate, a pointer disposed in front of the first plate adjacent to the obverse face, one end of said pointer being affixed to the shaft such that the pointer is rotatable with it, and a light member disposed in back of the second plate adjacent to the reverse face and substantially behind and parallel to the pointer, one end of the light member being affixed to the shaft such that the light member is rotatable with the shaft and the pointer, and the light member is capable of illuminating one colored bounded area of the band at any given time. As the shaft is rotated the pointer indicates a particular indicia and the colored bounded area above that indicia is illuminated from behind causing colored light to be visible both peripherally and directly by an observer, the colored light being associated with the particular indicia indicated by the pointer.

A method of increasing the safety of a driver of a motor vehicle by decreasing the frequency that the driver has to look away from the road ahead to observe the speedometer is disclosed. The method comprises the steps of having installed in the driver's motor vehicle a speedometer faceplate assembly comprising a face plate having an obverse face and a reverse face and indicia in the form of a numerical progression representing a range of speeds displayed on its obverse face, a light transmitting band disposed above the indicia, the band being divided into a plurality of substantially equal bounded areas, each of a different color, a rotatable shaft extending through the face plate, a pointer rotatable with the shaft and disposed adjacent to the obverse face of the face plate, a light member rotatable with the shaft and disposed adjacent to the reverse face of the face plate and substantially behind and parallel to the pointer, and the light member being capable of illuminating one colored bounded area of the band at any given time, the illuminated colored bounded area corresponding to the speed indicated by the pointer, and having each colored bounded area of the band of the speedometer faceplate assembly associated with a particular range of speeds. Also becoming acquainted with the colors associated with each range of speeds, and operating the motor vehicle so that as each of the colored bounded areas is illuminated the colored light is visible to the driver peripherally as well as directly and the driver becomes aware of the speed traveled without having to constantly look directly at the speedometer faceplate and away from the road and thereby becoming a safer driver.

Other features and advantages of the invention will be seen from the following description and drawings.

DETAILED DESCRIPTION OF THE INVENTION

Figure 1:
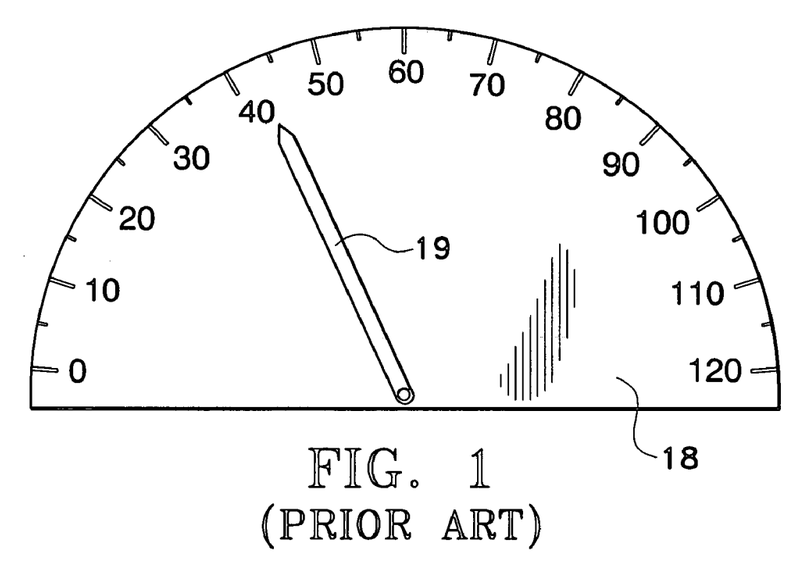
FIG. 1 is a plan view of a prior art speedometer faceplate.
Figure 2:
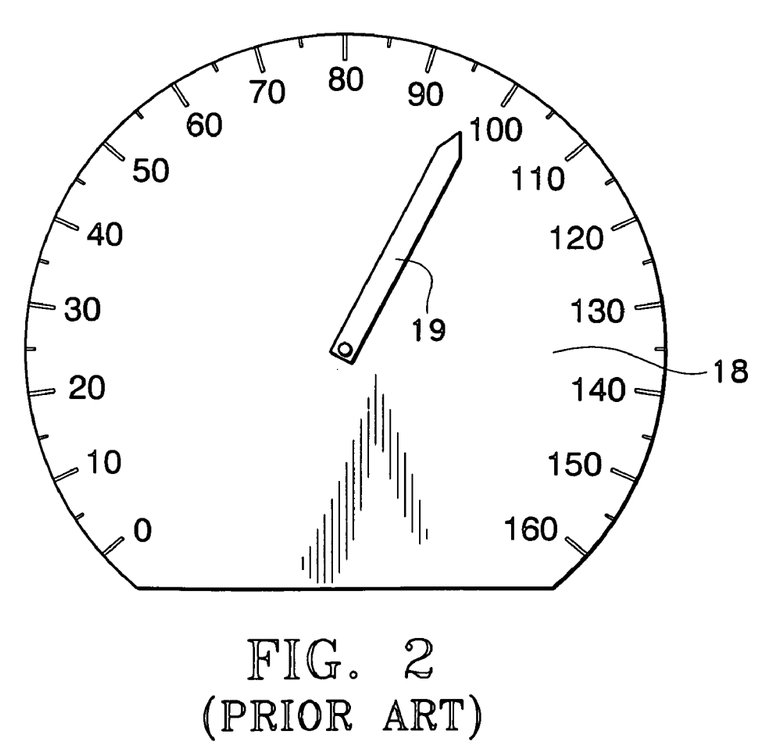
FIG. 2 is a plan view of another prior art speedometer faceplate.

The most common speedometer face plates currently being utilized are in the form of a semi-circle FIG. 1 or a substantially full circle FIG. 2. The face plate 18 is often black with white numerals or white with black numerals and may be highlighted with a single color when the dashboard lights are turned on. A centrally located pointer 19 my also exhibit color when the dashboard lights are turned on.

Figure 3:
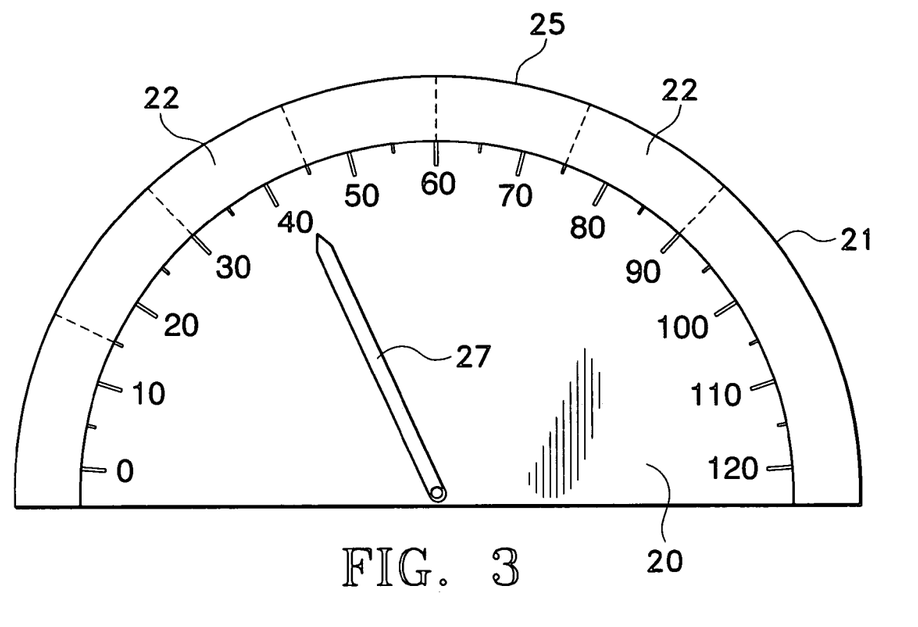
FIG. 3 is a plan view of a speedometer faceplate of the present invention with the color border.
Figure 4:
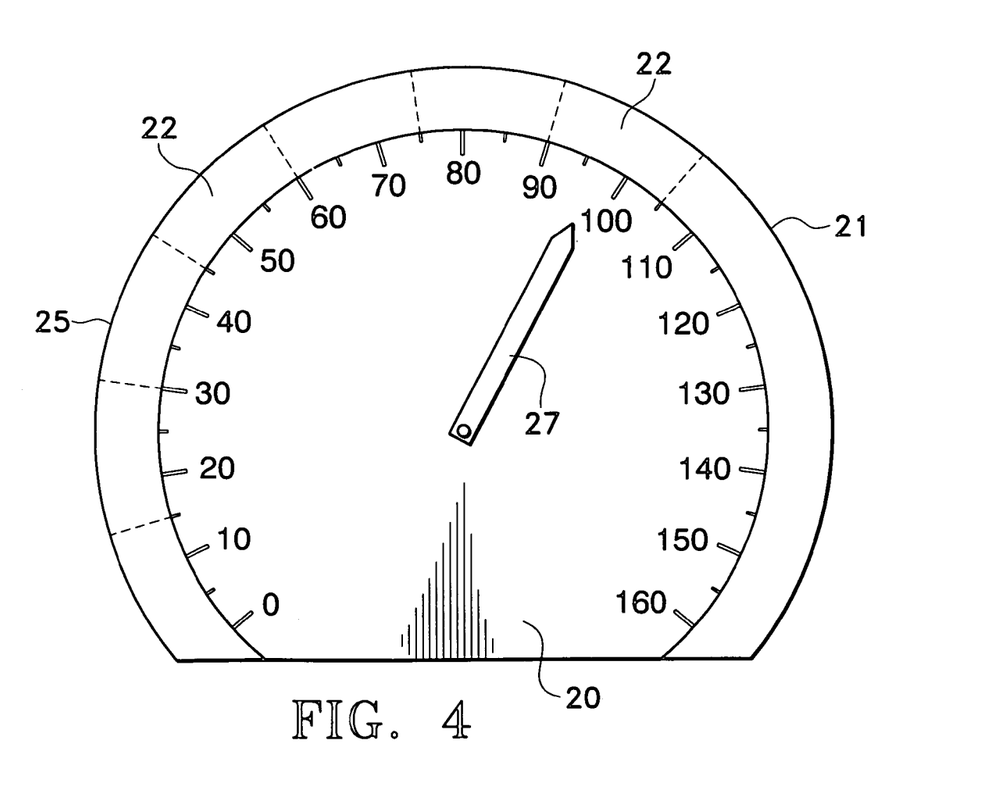
FIG. 4 is a is a plan view of another speedometer of the present invention with the color border.
Figure 6:
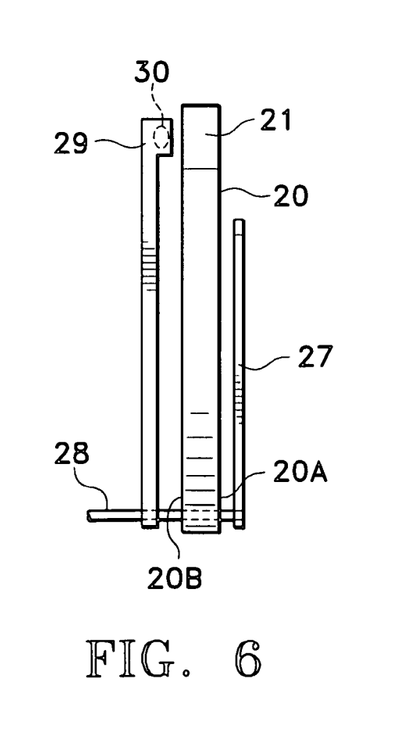
FIG. 6 is a side view of the speedometer of FIG. 5.
Figure 7:
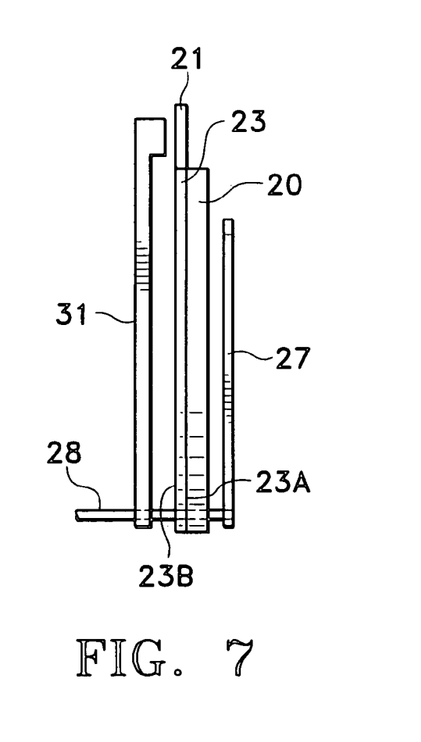
FIG. 7 is a side view of a speedometer utilizing two plates fused together.

The speedometer of the present invention may have a similar face plate 20, with an obverse face 20A and a reverse face 20B seen in FIG. 6, but with the addition of a band or border 21 extending outward beyond the numerals as seen in FIGS. 3 and 4. This border 21 may be transparent or translucent and may be divided into a series of bounded areas or segments 22, each of a different color. The border 21 may be an extension of the face plate 20 and made up of the same material as the face plate 20 or the border may be made of another material that is affixed to the outer rim of the face plate 20. Alternatively, the border 21 may be a portion of a second plate 23, also having an obverse face 23A and a reverse face 23B, that may be placed behind the face plate 20 and immediately adjacent to it sot that the outer portion of the second plate 23 extends beyond the outer rim of the face plate 20 exhibiting the border 21. (FIGS. 7 and 10) When two plates are used they may actually be contiguous or permanently affixed, one to the other, to form one cohesive unit. The border 21 may be divided into a series of bounded areas or segments 22, each of a different color.

There may be a movable pointer 27 to indicate the speed attained. This pointer 27 may be connected to a rotatable shaft 28 activated by the automobile's servo driver and passing through the faceplate 20 at a point centrally located along the base line.

Also attached to and rotatable with the shaft 28 may be a light source. The light source may have more than one form. One form may be a housing 29 containing one or more light bulbs 30 capable of concentrating a beam of light behind the border 21 so as to illuminate one of the color segments 22 at any given time. (FIGS. 5 and 6) Another form of the light source may be an L-shaped Lucite rod 31 that is illuminated from behind the faceplate 21 by methods well known in the art. This Lucite rod 31 may have a frosted or painted surface except for the bent end which may focus a light beam on the back of the border 21 so as to illuminate one color segment 22 at a time, in the same manner as the light bulb 30. (FIG. 7) Other forms of light sources known in the art may be also be used to illuminate the border, one segment at a time.

When two plates are used, the second plate 23 may be divided into wedge shaped divisions 24 which extend from a common hub 26 outward to the outer edge 25 of the second plate 23. These divisions may be seen in FIGS. 8 and 10. When the wedge shaped divisions 24 are used the colors may extend throughout each wedge shaped division 24. When the wedge shaped divisions 24 are lighted from behind, the colors may be imparted to the speed indicator numerals, to light transmitting areas around the numerals, or to other light transmitting areas on the face plate 20 in addition to the border 21. Wedge shaped light transmitting areas 35 may be formed on the faceplate 20 beneath the indicator numerals in addition to the border 21. The material of which the face plate 20 may be composed or an appropriate coating applied to specific areas of the face plate 20 may determine the shape and extent of the color highlighted light transmitting areas.

Figures 10, 11:
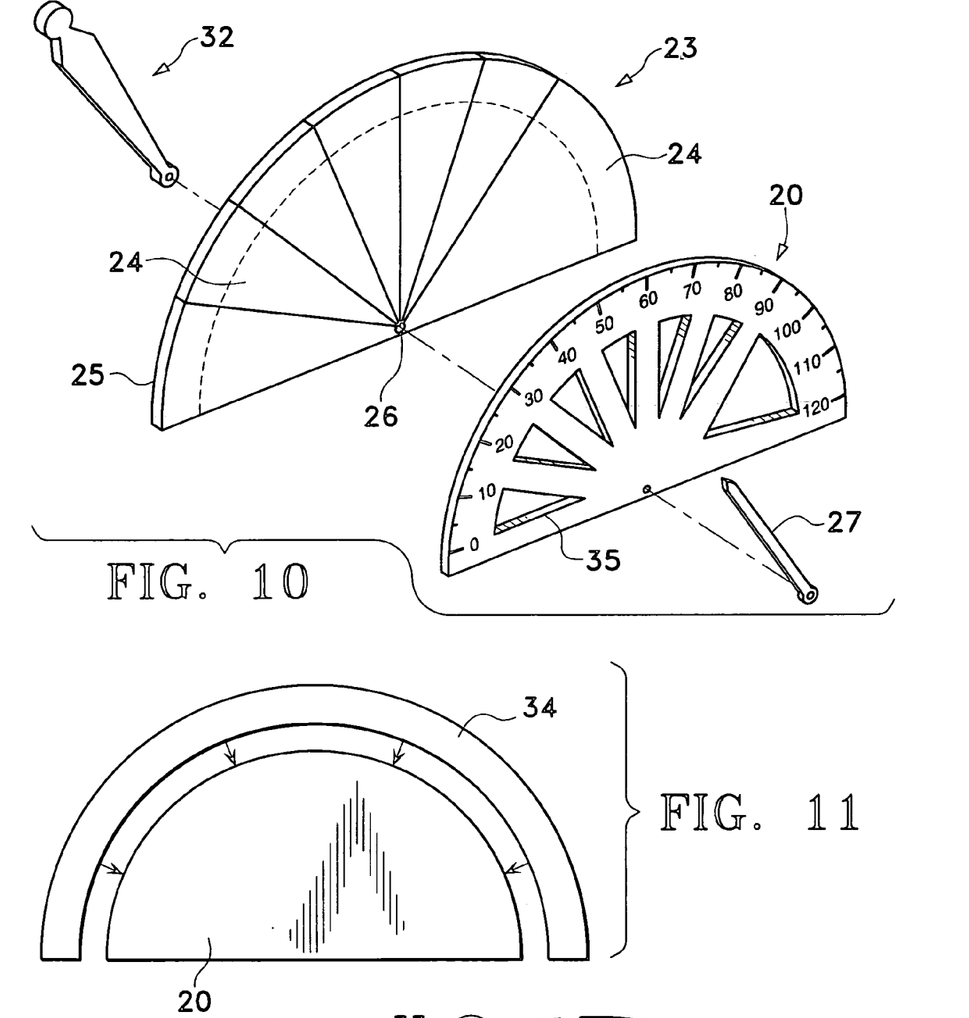
FIG. 10 is a perspective view of the two plates, light source and pointer of the speedometer of FIG. 8.
FIG. 11 is a plan view of a faceplate and border.

The extent of the colored light transmitting areas on the face plate 20 may be also dependent upon the shape and exposed area of the Lucite rod 31 or other form of the light source. The Lucite rod 31 may be frosted or painted and have a clear strip along its front surface to concentrate a line of light on the back of a wedge shaped division 24, or it may be shaped to transmit a wedge of light to correspond to the wedge-shaped division 24 and thereby illuminate a wedge shaped section on the face plate 20. If the result is to have a wedge shaped area highlighted with colored light as well as a segment of the border 21, there may be a special light source 32 shaped with a rounded top portion and a wedge-shaped lower portion as seen in FIG. 10. The entire light source, can be wedge-shaped (not illustrated) if desired. The light source may be shaped to highlight a specific area on the face plate 20, or, parts of the light source may be frosted or painted over so that partial areas may be highlighted. The composition of the face plate 20 may be selected so the colored light may be transmitted through the chosen portions of the face plate 20 to best provide the desired result.

The colors may be seen from the front of the faceplate 21 as a lighted portion of color within the border 21 and a wedge shaped lighted portion of color beneath the numerals. Thus there may be a second lighted area having the same color as the lighted portion of the border 21. The back lighting may cause a colored glow to the border segment or a more intense light depending on the type of light source and degree of transparency of the material used. The colored light may be seen peripherally by the driver without his having to look away from the road, and may of course be visible when viewed directly.

The border 21 may be divided into several segments 22 which may be delineated, discrete bands of color, or the colors may flow one into the other much as the colors of a rainbow. This may also be true when the second plate 23 is divided into colored wedge shaped divisions 24. Each color may be associated with a range of speeds. The more colors used, the smaller the range of speeds that may be associated with a given color. Once familiar with the color system, a driver may know the speed attained merely from the color transmitted without constantly looking at the speedometer.

Any combination of colors may be chosen, but a logical color progression may provide the best way to signal the driver as the speed changes and may be the easiest set of colors with which to become familiar. The best known color progression may be the common spectrum, i.e., violet, blue, green, yellow, orange and red. Though the instant discussion may suggest the use of the spectrum, it is to be understood that any series of colored bands may be utilized as long as no color is repeated.

Figure 5:
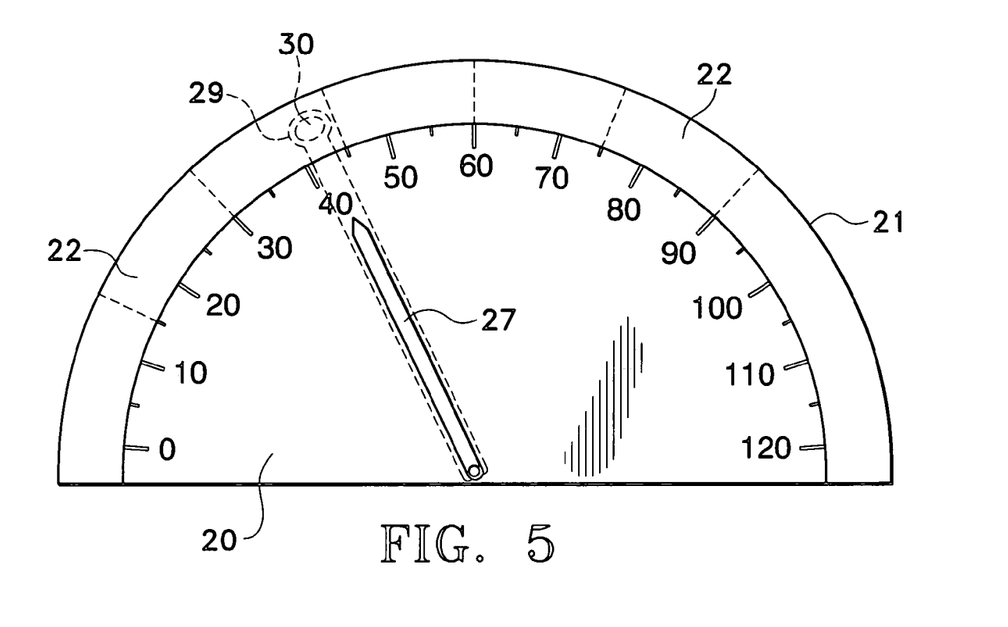
FIG. 5 is a plan view of the faceplate of FIG. 3 with the light source visible behind the faceplate.
Figure 8:
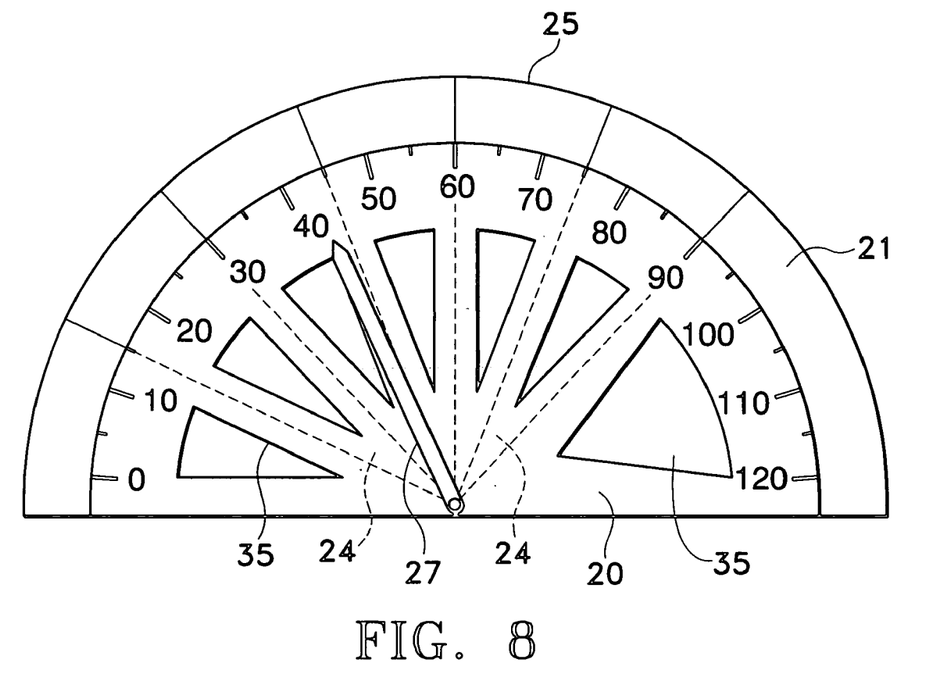
FIG. 8 is a plan view of a speedometer faceplate with wedge segments of color.

The border 21 may be divided into discrete and substantially equal bands of color with each band representing a 15 mile per hour (mph) increment. However, the increments may be more than 15 mph or less than 15 mph. One example may be to divide the border 21 (or entire the second plate 23) into seven segments seen in FIGS. 3, 5 and 8 and represented by the colors noted below:

| | |
|---|---|
| 0–15 mph | violet |
| 15–30 mph | blue |
| 30–45 mph | green |
| 45–60 mph | yellow |
| 60–75 mph | orange |
| 75–90 mph | red |
| over 90 mph | deep red |

Each color may be a single primary color, as noted above, or there may be blended colors in addition to the primary colors. The use of blended colors may decrease the speed increment represented by each color segment and may permit many more color variations. The color in each segment may also be darker in the center and lighter at the edges.

Figure 9:
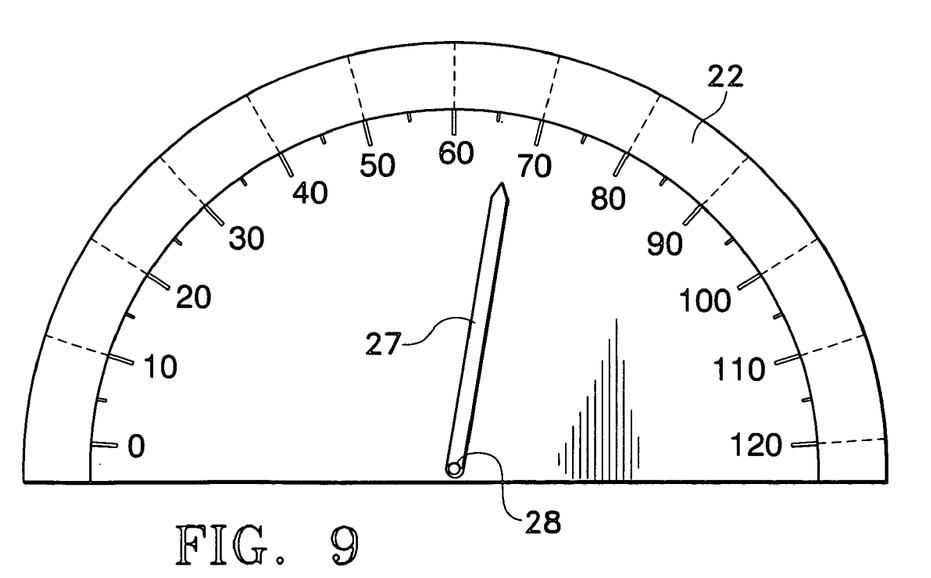
FIG. 9 is a speedometer faceplate with smaller speed increments represented by more color segments.

Another example may be to divide the colored area into twelve segments as seen in FIG. 9 with each segment representing an increment of 10 mph:

| | |
|---|---|
| 0–10 mph | violet |
| 10–20 mph | violet-blue |
| 20–30 mph | blue |
| 30–40 mph | blue green |
| 40–50 mph | green |
| 50–60 mph | green-yellow |
| 60–70 mph | yellow |
| 70–80 mph | yellow-orange |
| 80–90 mph | orange |
| 90–100 mph | orange-red |
| 100–110 mph | red |
| over 110 mph | deep red |

These examples may be representative only and are not intended to exclude any other series of colors or color combinations.

If the speedometer system of the present invention was to gain widespread acceptance, a specific color series may be chosen and used throughout the industry. This may acquaint drivers with the chosen color sequence to the extent that they become accustomed to the range of speeds that each color represents. The driver may know from the color changes that the speed is increasing or decreasing and the speed traveled. This information may be imparted to the driver through peripheral vision without the need to actually look at the speedometer. It may also be imparted by direct viewing which may be of shorter duration then needed to read the numerals. This system may reduce the frequency that a driver would have to look away from the road and would thereby increase driving safety.

The light behind the faceplate 20 and color border 21 may be provided by a high intensity light source so that the colors may be quite visible in daylight as well as during night time driving. Less intense lighting may provide sufficient color enhancement for the colors to be easily visible to the driver's peripheral vision at night. An appropriate adjustment may be associated with headlight use.

Figure 12:
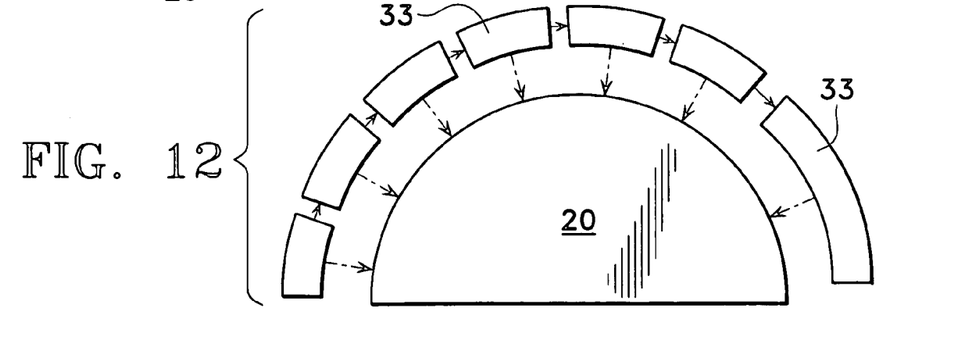
FIG. 12 is a plan view of a faceplate and individual color segments.

Today's technology permits the manufacture of transparent or translucent plates imparted with any desired color. The colors may be painted on the border 21 of the face plate or applied with permanent gelatins or any other method known in the art. It may also be possible to permanently join segments 33 of the different colors to make up the border (FIG. 12) or the wedge shaped divisions. The border 21 containing the colored segments may be a part of a second plate 23, or it may be a separate border 34 joined to a single faceplate 20 of the speedometer assembly. (FIG. 11)

The face plate may be of any desired shape including a linear rectangular face plate as well as the round plates illustrated. A colored border may be used with face plates of any shape.

Depending upon the size of the colored segments of the border and the intensity of the light source used, the amount of colored light transmitted through the segments can vary. The segments may be curved to magnify and/or diffuse the light, or, dots may be placed over the surface of the segments as a means to diffuse the light. Additionally, a magnifying layer may be placed over the border. Any of these systems may be used to increase the peripheral light effect.

While several embodiments of the present invention have been illustrated and described in detail, it is to be understood that this invention is not limited thereto and may be otherwise practiced within the scope of the following claims.

I claim:

1. An instrument face plate assembly comprising:
   a face plate having an obverse face and a reverse face with indicia in the form of a numerical progression on the obverse face;
   a light transmitting band disposed above said indicia, said band being divided into a plurality of bounded areas, each bounded area being of a different color;
   a rotatable shaft extending through said face plate;
   a pointer disposed in front of said face plate adjacent to the obverse face, one end of said pointer being affixed to said shaft such that the pointer is rotatable with the shaft; and
   a light member disposed in back of said face plate adjacent to said reverse face and substantially behind and parallel to said pointer, one end of the light member being affixed to said shaft such that the light member is rotatable with the shaft and the pointer, and said light member being capable of illuminating one colored bounded area of the band at any given time;
   whereby, as the shaft is rotated the pointer indicates a particular indicia and the colored bounded area above that indicia is illuminated from behind causing colored light to be visible both peripherally and directly by an observer, said colored light being associated with the particular indicia indicated by the pointer.

2. An instrument face plate assembly as described in claim 1 wherein each colored bounded area represents a specific increment of the numerical progression.

3. An instrument face plate assembly as described in claim 2 wherein the specific increments of the numerical progression are substantially equal.

4. An instrument face plate assembly as described in claim 1 wherein the light member comprises a housing and a light bulb, said light bulb being focused on the reverse side of one of the colored bounded areas as the shaft rotates.

5. An instrument face plate assembly as described in claim 1 wherein the light member comprises an illuminated L-shaped Lucite rod such that light is transmitted through the rod and concentrated on the reverse side of one of the colored bounded areas as the shaft rotates.

6. An instrument face plate assembly comprising:
   a first plate having an obverse face and a reverse face and indicia in the form of a numerical progression on the obverse face;
   a second plate having an obverse face and a reverse face disposed behind and contiguous with said first plate and extending therebeyond, the extension forming a light transmitting band disposed above the indicia, said band being divided into a plurality of bounded areas, each bounded area being of a different color;
   a rotatable shaft extending through said first plate and said second plate;
   a pointer disposed in front of said first plate adjacent to the obverse face, one end of said pointer being affixed to said shaft such that the pointer is rotatable therewith; and
   a light member disposed in back of said second plate adjacent to the reverse face and substantially behind and parallel to said pointer, one end of the light member being affixed to said shaft such that the light member is rotatable with the shaft and the pointer and said light member being capable of illuminating one colored bounded area of the band at any given time;
   whereby, as the shaft is rotated the pointer indicates a particular indicia and the colored bounded area above that indicia is illuminated from behind causing colored light to be visible both peripherally and directly by an observer, said colored light being associated with the particular indicia indicated by the pointer.

7. An instrument face plate assembly as described in claim 6 wherein each colored bounded area represents a specific increment of the numerical progression.

8. An instrument face plate assembly as described in claim 7 wherein the increments of the numerical progression are substantially equal.

9. An instrument face plate assembly as described in claim 6 wherein the light member comprises a housing and a light bulb, said light bulb being focused on the reverse side of one of the colored bounded areas as the shaft rotates.

10. An instrument face plate assembly as described in claim 6 wherein the light member comprises an illuminated L-shaped Lucite rod such that light is transmitted through the rod and concentrated on the reverse side of one of the colored bounded areas as the shaft rotates.

11. An instrument face plate assembly as described in claim 6 wherein the bounded areas are wedge-shaped, the color of each colored bounded area being the same throughout.

12. An instrument face plate assembly as described in claim 11 wherein the light member is configured to concentrate the light on the reverse side of the entire area of one of the colored wedge-shaped bounded areas as the shaft rotates.

13. An instrument face plate assembly as described in claim 12 further comprising light transmitting areas through the first plate such that when illuminated from the reverse side of the second plate, colored light can be seen both peripherally and directly along the band and through the light transmitting areas by an observer situated in front of the face plate assembly.

14. An instrument face plate assembly as described in claim 12 further comprising wedge-shaped light transmitting areas through the first plate and situated beneath the indicia, said wedge-shaped areas being light transmitting such that when illuminated from the reverse side of the second plate, colored light can be seen along the band and through the wedge-shaped areas both peripherally and directly by an observer situated in front of the face plate assembly.

15. An instrument face plate assembly as described in claim 6 wherein the colored bounded areas are represented by the colors of the spectrum.

16. An instrument face plate assembly as described in claim 6 wherein the indicia represent the speeds traveled by a motor vehicle.

17. An instrument face plate assembly as described in claim 16 wherein each colored bounded area is associated with a speed increment of at least 15 miles per hour.

18. An instrument face plate assembly as described in claim 17 wherein each colored bounded area is associated with a speed increment of at least 10 miles per hour.

19. A method of increasing the safety of a driver of a motor vehicle by decreasing the frequency that the driver has to look away from the road ahead to observe the speedometer, said method comprising the steps of:

having installed in the driver's motor vehicle a speedometer faceplate assembly comprising a face plate having an obverse face and a reverse face and indicia in the form of a numerical progression representing a range of speeds displayed on the obverse face thereof, a light transmitting band disposed above said indicia, said band being divided into a plurality of substantially equal bounded areas, each of a different color, a rotatable shaft extending through said face plate, a pointer rotatable with said shaft disposed adjacent the obverse face of said face plate, a light member rotatable with said shaft disposed adjacent the reverse face of said face plate and substantially behind and parallel to said pointer, and said light member being capable of illuminating one colored bounded area of the band at any given time, the illuminated colored bounded area corresponding to the speed indicated by the pointer;

having each colored bounded area of the band of the speedometer faceplate assembly associated with a particular range of speeds;

becoming acquainted with the colors associated with each range of speeds; and operating the motor vehicle;

whereby as each colored bounded area is illuminated the colored light is visible to the driver peripherally as well as directly and the driver becomes aware of the speed traveled without having to constantly look directly at the speedometer faceplate and away from the road and thereby becoming a safer driver.

* * * * *